(12) United States Patent
Reddy Kambham et al.

(10) Patent No.: US 11,177,643 B2
(45) Date of Patent: *Nov. 16, 2021

(54) ELECTRONIC FUSE

(71) Applicant: TEXAS INSTRUMENTS INCORPORATED, Dallas, TX (US)

(72) Inventors: Taraka Rama Chandra Reddy Kambham, Freising (DE); Karl-Heinz Steinmetz, Durmersheim (DE); Balázs Kelenvölgyi, Budapest (HU)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 162 days.

This patent is subject to a terminal disclaimer.

(21) Appl. No.: 16/580,576

(22) Filed: Sep. 24, 2019

(65) Prior Publication Data

US 2020/0091701 A1 Mar. 19, 2020

Related U.S. Application Data

(63) Continuation of application No. 15/465,280, filed on Mar. 21, 2017, now Pat. No. 10,424,908.

(51) Int. Cl.
*H02H 3/04* (2006.01)
*G05F 5/00* (2006.01)
(Continued)

(52) U.S. Cl.
CPC ............. *H02H 3/04* (2013.01); *G05F 5/00* (2013.01); *H02H 1/06* (2013.01); *H02H 3/06* (2013.01); *H02H 3/087* (2013.01)

(58) Field of Classification Search
CPC .. H02H 1/06; H02H 3/04; H02H 3/06; H02H 3/087; G05F 5/00
(Continued)

(56) References Cited

U.S. PATENT DOCUMENTS 5,652,502 A 7/1997 van Phuoc et al.
6,349,022 B1 2/2002 Myong et al.
(Continued)

FOREIGN PATENT DOCUMENTS

CN 104184124 12/2014
CN 107404309 11/2017
(Continued)

OTHER PUBLICATIONS

Chinese search report in corresponding Chinese Patent Application No. 201810233575.6, dated Mar. 24, 2021 (7 pages).

*Primary Examiner* — Kevin J Comber
(74) *Attorney, Agent, or Firm* — John R. Pessetto; Charles A. Brill; Frank D. Cimino

(57) ABSTRACT

A device includes a current monitor, an electronic switch, an energy harvester, and a load controller. The current monitor monitors current drawn by a load coupled to the device and generate an alert signal in response to the monitored current exceeding a predefined threshold value. The electronic switch decouples a battery from the load in response to the alert signal, the electronic switch being electrically disconnected from a negative terminal of the battery coupled to the device. The energy harvester stores energy from the battery while the load is drawing current from the battery. The load controller receives, from the energy harvester, the stored energy from the energy harvester and generates a voltage to power the current monitor to reset the alert signal while the battery is decoupled from the load.

19 Claims, 6 Drawing Sheets

(51) Int. Cl.
*H02H 3/087* (2006.01)
*H02H 1/06* (2006.01)
*H02H 3/06* (2006.01)

(58) Field of Classification Search
USPC .......................................................... 361/101
See application file for complete search history.

(56) References Cited

U.S. PATENT DOCUMENTS

| | | |
|---|---|---|
| 6,850,396 B1 | 2/2005 | Clemo et al. |
| 2002/0026287 A1 | 2/2002 | Mizuno et al. |
| 2002/0109539 A1 | 8/2002 | Takeuchi et al. |
| 2008/0100272 A1 | 5/2008 | Yoshio |
| 2010/0027180 A1 | 2/2010 | Bingel et al. |
| 2011/0128656 A1 | 6/2011 | Kohler |
| 2011/0278955 A1 | 11/2011 | Signorelli et al. |
| 2014/0025221 A1 | 1/2014 | Chapel et al. |
| 2014/0176164 A1 | 6/2014 | Davis |
| 2017/0110874 A1 | 4/2017 | van Dijk et al. |

FOREIGN PATENT DOCUMENTS

| | | |
|---|---|---|
| EP | 2765589 A1 | 8/2014 |
| WO | 9615563 | 5/1996 |

ELECTRONIC FUSE

CROSS-REFERENCE TO RELATED APPLICATION

This application is a continuation of U.S. patent application Ser. No. 15/465,280 filed on Mar. 21, 2017, which is incorporated herein by reference.

TECHNICAL FIELD

This disclosure relates generally to a fuse and, more particularly to an electronic fuse.

BACKGROUND

A fuse is an electrical device that is used in an electrical system to protect against excessive current. Irrespective of a reason for this excessive current, for example should a load coupled to a power supply draw excessive current from the power supply, the fuse disconnects the load from the power supply to prevent damage within the electrical system caused by this excessive current. A fuse typically includes a conductor whose physical dimensions are selected to limit current to a threshold value. In the event that current exceeds this threshold value, the conductor melts to prevent the excessive current from damaging the electrical system. Thereafter, the fuse is disposed of and replaced to restore current to the load. Fuses have application in automotive electrical systems, home electrical systems, electronic circuits, etc.

SUMMARY

One example includes a device that includes a current monitor, an electronic switch, an energy harvester, and a load controller. The current monitor monitors current drawn by a load coupled to the device and generate an alert signal in response to the monitored current exceeding a predefined threshold value. The electronic switch decouples a battery from the load in response to the alert signal, the electronic switch being electrically disconnected from a negative terminal of the battery coupled to the device. The energy harvester stores energy from the battery while the load is drawing current from the battery. The load controller receives, from the energy harvester, the stored energy from the energy harvester and generates a voltage to power the current monitor to reset the alert signal while the battery is decoupled from the load.

Another example includes a method that monitors, with a current monitor, current drawn by a load coupled to the device. The method further stores, with an energy harvester, energy from a battery coupled to the device while the load is drawing current from the battery. The method further generates, with the current monitor, an alert signal in response to the monitored current exceeding a predefined threshold value. The method further selectively decouples, with an electronic switch that is electrically disconnected from a negative terminal of a battery, the battery from the load in response to the alert signal. The method further generates, with the load controller, a voltage from the stored energy to power the current monitor to reset the alert signal while the battery is decoupled from the load.

Another example includes a device that includes a current monitor, first and second electronic switches, an energy harvester, a load controller, and an interconnection controller. The current monitor monitors current drawn by a load coupled to the device and generates an alert signal in response to the monitored current exceeding a predefined threshold value. The first and second electronic switches are in series between a battery and the load. The energy harvester stores energy from the battery while the load is drawing current from the battery. The load controller receives, from the energy harvester, the stored energy and generates a voltage to power the current monitor to reset the alert signal while the battery is decoupled from the load. The interconnection controller, in a first configuration, selectively couples the first electronic switch to the energy harvester and configures the second electronic switch to selectively decouple the battery from the load in response to the alert signal, and, in a second configuration, selectively couples the second electronic switch to the energy harvester and configures the first electronic switch to selectively decouple the battery from the load in response to the alert signal.

DETAILED DESCRIPTION

This disclosure relates generally to a fuse and, more particularly to an electronic fuse (which can also be referred to as an e-fuse) that is electrically disconnected from a negative terminal of a battery or ground. The electronic fuse is a device that includes an active element that selectively couples and decouples a battery (or a terminal of a battery) to and from a load based on an amount of current flowing from the battery to the load. The electronic fuse can be reset based on current flowing from the battery to the load exceeding a predefined threshold value. Such resetting eliminates having to replace the electronic fuse as is typically done in response to current flowing from the battery to the load exceeding a threshold value For example, a device is disclosed, such as an electronic fuse, which includes a current monitor that monitors current drawn by a load coupled to the device. An electronic switch selectively couples and decouples the battery to and from the load in response to the monitored current drawn by the load crossing a predefined threshold value, with the electronic switch being electrically disconnected from, that is without a connection to, a negative terminal of a battery coupled to the device. An energy harvester stores energy from the battery while the load is drawing current from the battery, the stored energy powering the current monitor and the electronic switch in response to the electronic switch selectively decoupling the load from the battery. A load controller receives, from the energy harvester, the energy stored from the battery coupled to the device and generates a voltage to power the current monitor and the electronic switch in response to the electronic switch selectively decoupling the load from the battery. Such a configuration allows the device, the electronic fuse, to replace an existing single use fuse without requiring any modification to the system in which the electronic fuse is utilized. Such a device can reset itself to again allow current to flow to the load, eliminating fuse replacement. Eliminating fuse replacement is a great benefit in automotive applications in which an owner of an automobile may not know where their fuses are located and/or may not possess a new fuse to replace a blown fuse. In some instances, eliminating fuse replacement may prevent an automobile owner from being stranded.

Figure 1:
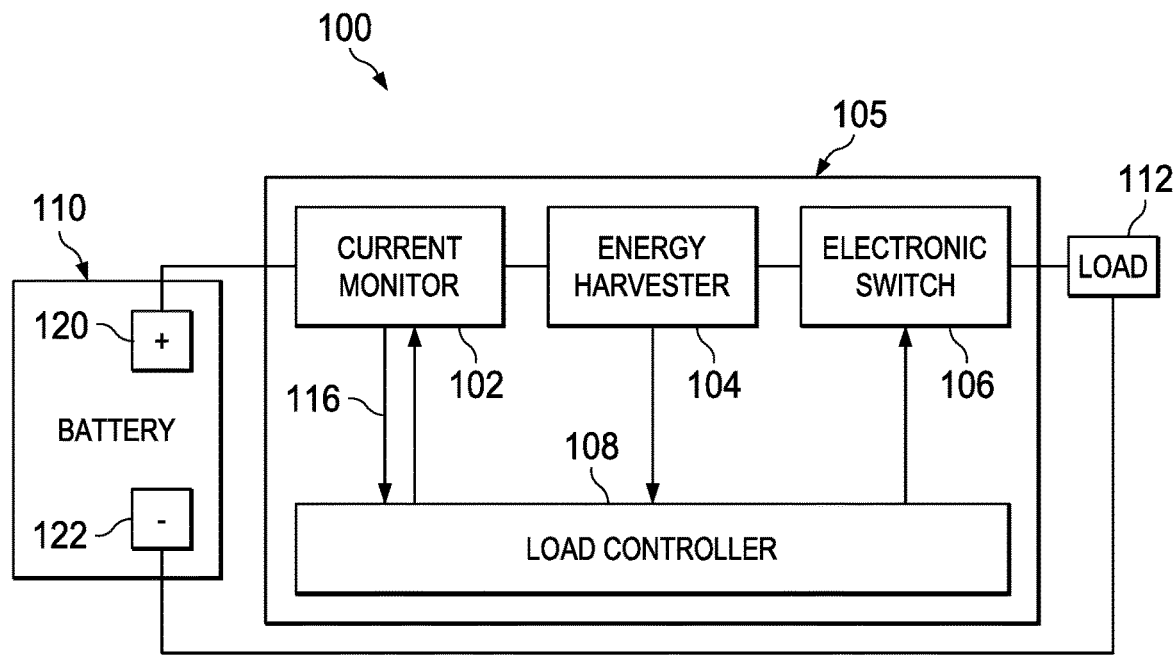
FIG. 1 illustrates an example of a system that includes a device to selectively couple and decouple a battery and a load.

FIG. 1 illustrates an example of a system 100 that includes an electronic fuse 105 (a device) to selectively couple and decouple a battery 110 and a load 112. In an example, the electronic fuse 105 is used on a single wire to couple and decouple the battery 110 and the load 112 without the electronic fuse 105 being powered by an external power supply. Thus, since the electronic fuse 105 is used on a single wire, the electronic fuse may, in some examples, include at most two-terminals. The electronic fuse 105 includes a current monitor 102 that is coupled to a battery 110 and an energy harvester 104. The battery 110 includes a positive terminal 120 and a negative terminal 122 or ground terminal. The current monitor 102 monitors current drawn by a load 112 coupled to the electronic fuse 105. The current monitor 102 performs a current measurement of an amount current that is being drawn from the battery 110 by a load 112. The current monitor 102 compares this current measurement to a configurable predefined current limit threshold. Should this current limit threshold be crossed, that is the current drawn by the load 112 exceeds this current limit threshold, the current monitor 102 latches this threshold crossing as an error condition within the electronic fuse 105 and generates an alert signal on alert signal line 116 (for example, the alert signal line 116 goes LOW) that is transmitted to a load controller 108.

The energy harvester 104 is further coupled to the electronic switch 106 and a load controller 108. The energy harvester 104 stores energy from the battery 110 while the load 112 is drawing current from the battery 110. When the electronic switch 106 selectively decouples the load 112 from the battery 110, the energy harvester 104 provides an alternate source of power for the electronic switch 106, the alternate power source powering the load controller 108 and current monitor 102.

The load controller 108 is further coupled to the current monitor 102 and the electronic switch 106. The load controller 108 receives the stored power from the energy harvester 104 and generates a voltage that is applied to the current monitor 102 and the electronic switch 106. In response to the current monitor 102 generating the alert signal on alert signal line 116, the load controller 108 withholds application of its voltage to the electronic switch 106 which turns OFF electronic switch 106 to prevent current from flowing from the battery 110 to the load 112. In response to the alert signal, the load controller 108 applies the generated voltage to the current monitor 102 to continue to monitor the current being drawn by the load 112 from the battery 110.

The electronic switch 106 is further coupled to the load 112. The electronic switch 106 selectively couples and decouples the battery 110 and the load 112. When the current monitored by the current monitor 102 is less than the current limit threshold, the electronic switch 106 allows current to flow from the battery 110 to the load 112. In response to the current monitored by the current monitor 102 exceeding the current limit threshold, the electronic switch 106 prevents current from flowing from the battery 110 to the load 112.

The current monitor 102, energy harvester 104, and load controller 108 are electrically disconnected from the negative terminal 122 of the battery 110, such that their operation is not dependent upon being coupled to the negative terminal 122 of the battery 110.

Figure 2:
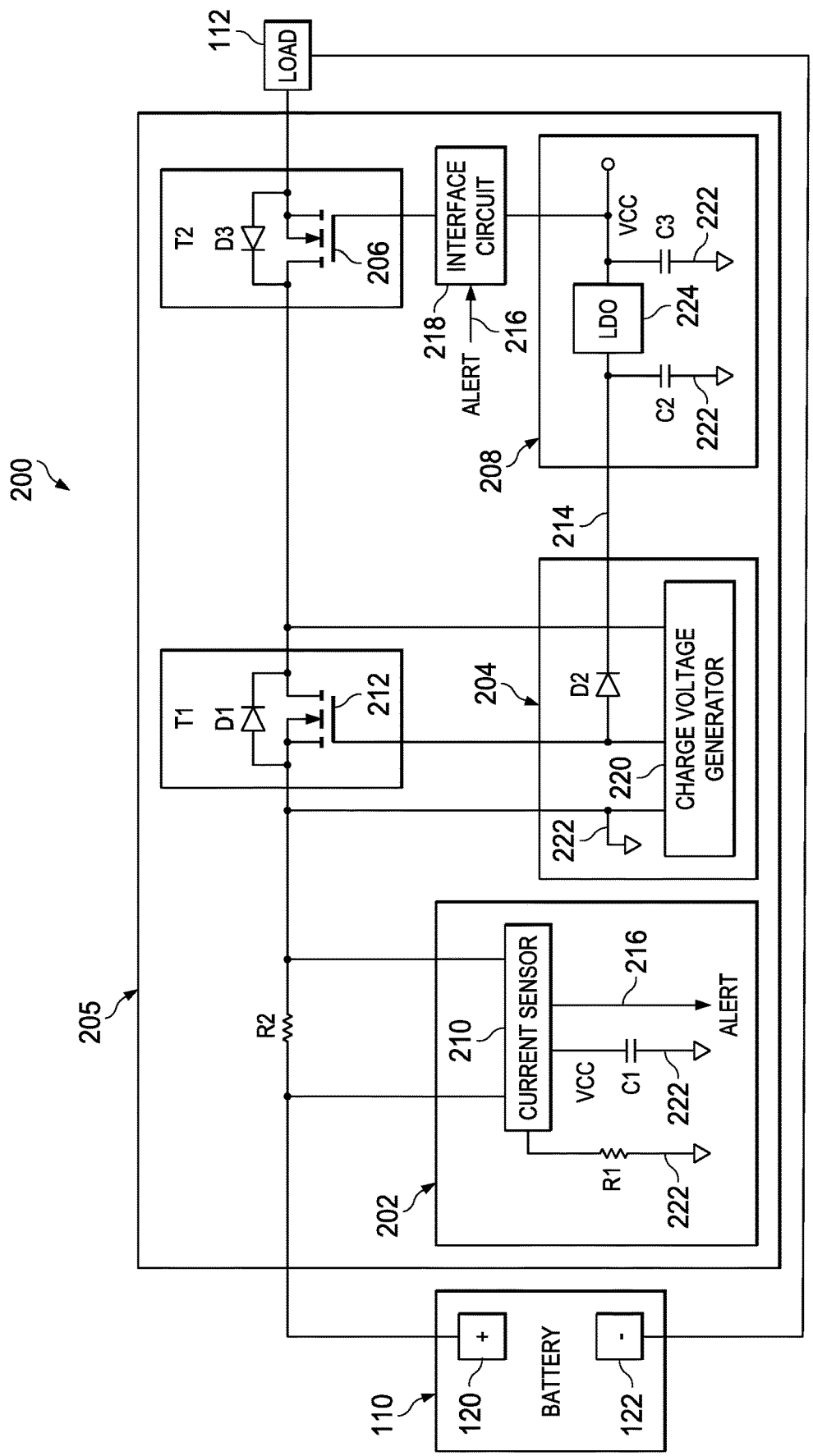
FIG. 2 illustrates an example of another system that includes a device to selectively couple and decouple the battery and the load.

FIG. 2 illustrates another example of another system 200 that includes an electronic fuse 205 to selectively couple and decouple the battery 110 and the load 112. The electronic fuse 205 includes detailed examples of a current monitor 202, an energy harvester 204, and a load controller 208. The current monitor 202 is coupled in parallel to a resistor R2 (or any other relevant sensing mechanism) which is in series between the positive terminal 120 of the battery 110 and the energy harvester 204. In an example, the resistor R2 is a shunt resistor. The current monitor 202 further includes a current sensor 210 that is electrically coupled in parallel with the resistor R2. The current sensor 210 is coupled to resistor R1 and capacitor C1. A terminal of resistor R1 is coupled to reference 222. A voltage, for example a common current voltage (Vcc), generated by a load controller 208 is applied to the current sensor 210 at a first terminal of the capacitor C1. A second terminal of the capacitor C1 is coupled to reference 222. The current sensor 210 performs a current measurement via the resistor R2 of an amount current that is being drawn from the battery 110 by the load 112. The current monitor 202 compares this current measurement to a configurable current limit threshold. Should this current limit threshold be crossed, that is the current drawn by the load 112 exceeds this current limit threshold, the current sensor 210 latches this threshold crossing as an error condition within the electronic fuse 205 and generates an alert signal on alert signal line 216 that is transmitted to the load controller 208. The current monitor 202 may, in some examples, be selected to attain optimal accuracy and minimize current draw.

The energy harvester 204 is further coupled to an electronic switch 212 and a load controller 208. The electronic switch 212 is in series between the resistor R2 and electronic switch 206, with the drains of the electronic switches 212 and 206 being coupled. In an example, the electronic switches 212 and 206 are metal-oxide-semiconductor field-effect (MOSFET) transistors. (e.g., power MOSFETs). Electrically parallel with electronic switch 212 is a diode D1 that is coupled to a drain and source of the electronic switch 212, an anode of the diode D1 coupled to the source of the electronic switch 212 and a cathode of the diode D1 coupled to the drain of the electronic switch 212. The electronic switch 212 is turned on and off with a duty cycle to allow the voltage drop across the electronic switch 212 to regenerate the power in energy harvester 204. The source of the electronic switch 212 is taken as a reference for the electronic fuse 205, shown as reference 222. Reference 222 is a set point for the operation of energy harvester 204, current monitor 222 and load controller 208. The power converted in energy harvester 204 is floating from the electronic switch element 212, so the reference point can be taken from the drain or source of electronic switch element 212.

The energy harvester 204 includes a charge voltage generator 220 that is electrically coupled in parallel with the electronic switch 212, coupled to the source, drain, and gate of the electronic switch 212. In an example, the charge voltage generator 220 is an LM74670 controller (e.g., LM74670-Q1) made by Texas Instruments Incorporated. The charge voltage generator 220 stores energy from the battery 110 while the load 112 is drawing current from the battery 110. When the electronic switch 206 selectively decouples the load 112 from the battery 110, the charge voltage generator 220 remains functional to power the load controller 208. The electronic switch 212 switches ON and OFF according to a duty cycle. In an example, the charge voltage generator 220 generates a gate to source voltage for the electronic switch 212 to continuously switch the electronic switch 212 ON and OFF. The charge voltage generator 220 switches the electronic switch 212 ON and OFF according to the duty cycle that includes an approximately 98% ON time period and an approximately 2% OFF time period, the time period is based on a demand of the load 112 and the circuitry powered by the energy harvester 204. In an example, the charge voltage generator 220 is charged during the OFF time period.

The load controller 208 is further coupled to the current monitor 202 and the interface circuit 218. The load controller 208 includes a low-dropout (LDO) regulator 224 that includes an input that is coupled to node 214 to receive stored power from the charge voltage generator 220 and an output coupled to capacitor C2 which is coupled to reference 222. The LDO regulator 224 is further coupled to the interface circuit 218. The LDO regulator 224 outputs a voltage, for example Vcc, which is supplied to the interface circuit 218 and the current sensor 210. The LDO regulator 224 controls biasing of the electronic switch 206. A diode D2 is in series between the gate of the electronic switch 212 and node 214 to prevent current from flowing back toward the charge voltage generator 220. An anode of the diode D2 is coupled to the gate of the electronic switch 212, and a cathode of the diode D2 is coupled to an input of the load controller 208.

The interface circuit 218 is further coupled to a gate of the electronic switch 206. Electrically parallel with electronic switch 206 is a diode D3 that is coupled to a drain and source of the electronic switch 206, with an anode of the diode D3 coupled to the source of the electronic switch 206 and a cathode of the diode D3 coupled to the drain of the electronic switch 206 and the source of the electronic switch 206 is coupled to the load 112. Thus, the diode D3 prevents current from flowing there through toward a source of the electronic switch 212 and the load 112 when the electronic switch 206 is in an OFF state. The interface circuit 218 provides and withholds the voltage generated by the LDO regulator 224 to the electronic switch 206 based on the alert signal generated by the current sensor 210. The interface circuit 218 provides the voltage generated by the LDO regulator 224 to the electronic switch 206 when the alert signal is HIGH. Likewise, the interface circuit 218 withholds the voltage generated by the LDO regulator 224 to the electronic switch 206 when the alert signal is LOW. The interface circuit 218 provides the voltage generated by the LDO regulator 224 to the electronic switch 206 when the current drawn by the load 112 is less than a predefined threshold value, as determined by the current sensor 210 to generate the HIGH alert signal applied to the interface circuit 218. The interface circuit 218 withholds the voltage generated by the LDO regulator 224 to the electronic switch 206 when the current drawn by the load 112 exceeds the threshold value, as determined by the current sensor 210 to generate the LOW alert signal to the interface circuit 218. Thus, the interface circuit 218 selectively controls current flow from the battery 110 to the load 112 according to the alert signal on the alert signal line 216. The interface circuit 218 can turn ON and OFF the current flow from the battery 110 to the load 112, via the electronic switch 206. This electronic switching of the electronic fuse 205 turns off when the current drawn by the load 112 exceeds the predefined threshold value. This electronic switching eliminates the electronic fuse 205 from having to be replaced once the current drawn by a load exceed a predefined threshold value, as is typically done with a disposable fuse. Although the interface circuit 218 is illustrated in FIG. 2 as being external to the load controller 208, in other examples, the interface circuit 218 may be located in the load controller 208. For example, the load controller 208 and the interface circuit 218 may together form the load controller 108 in FIG. 1.

Figure 3:
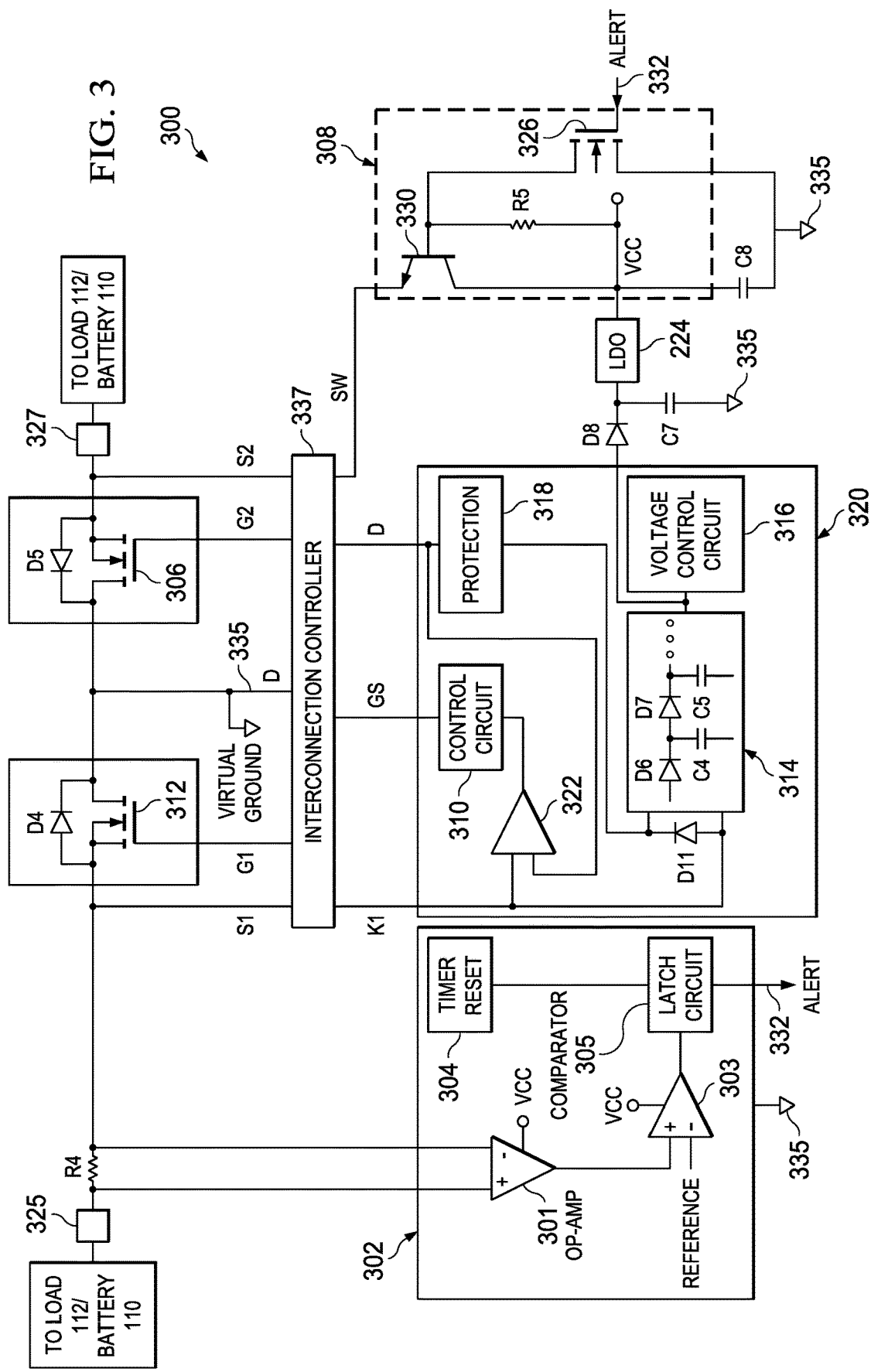
FIG. 3 illustrates an example bi-directional electronic fuse that includes interchangeable electronic switches to selectively couple and decouple the battery and the load.

FIG. 3 illustrates an example bi-directional electronic fuse 300 that includes interchangeable electronic switches 312 and 306 to selectively couple and decouple the battery 110 and the load 112. In this example, the bi-directional electronic fuse 300 is interchangeably coupled to the load 112 and the battery 110. The bi-directional electronic fuse 300 can be operated in two configurations. Thus, in a first configuration of the bi-directional electronic fuse 300 the node 325 of bi-directional electronic fuse 300 is coupled to the battery 110 and the node 327 of the bi-directional electronic fuse 300 is coupled to the load 112. In a second configuration of the bi-directional electronic fuse 300 the node 325 of the bi-directional electronic fuse 300 is coupled to the load 112 and node 327 of the bi-directional electronic fuse 300 is coupled to the battery 110. Such interchangeably allows the bi-directional electronic fuse 300 to be electrically coupled to a fuse box (FIG. 4) without a user having to know which direction the bi-directional electronic fuse 300 is to be coupled to the fuse box.

The bi-directional electronic fuse 300 includes a current sensor 302. The virtual ground node 335 is a reference point in an electronic fuse 300 that is maintained at a steady reference potential, from which voltages are measured, and provides a common return path for internal electric currents, without being coupled to the ground terminal of the battery 110. Operational amplifiers 301 and 303 may, in some examples, have a first input coupled to Vcc and a second input (or return input) coupled to virtual ground node 355. Since the electronic fuse 300 is electrically disconnected from, that is not directly connected to (negative) ground terminal of the battery 110, the virtual ground node 335 performs a function of the ground terminal of the battery 110 as a reference for the components within the electronic fuse 300. The current sensor 302 is powered by a voltage, for example Vcc, produced by an LDO regulator 224. The current sensor 302 includes an operation amplifier 301 whose two input nodes are coupled in parallel with shunt resistor R4. The operation amplifier 301 output is coupled to an input of another operation amplifier/comparator 303. The operation amplifiers 301 and 303 are powered by the voltage produced by the LDO regulator 224 (e.g., Vcc). In an example, the operation amplifier 303 receives a voltage Vcc produced by the LDO regulator 224. The operation amplifier 303 further receives a reference voltage at an inverting input that sets the threshold value for the current sensor 302. The operation amplifier 303 acts as a comparator. The operation amplifier 303 outputs an alert signal to the latch circuit 305 in response to detecting that the voltage level output by the operational amplifier 301 exceeds the threshold value. The latch circuit 305 latches the alert signal and outputs the alert signal on the alert signal node 332. The latch circuit 305 is further coupled to a timer/reset circuit 304. The timer/reset circuit 304 resets the alert signal latched by the latch circuit 305. In an example, the timer/reset circuit 304 is programmable to set a time period at which the timer/reset circuit 304 resets the latch circuit 305.

The bi-directional electronic fuse 300 further includes an electronic switch 312 that is coupled to the resistor R4, in series between nodes 325 and 327. A diode D4 is coupled in parallel to a drain and source of the electronic switch 312, an anode of the diode D4 coupled to the source of the electronic switch 312 and a cathode of the diode D1 coupled to the drain of the electronic switch 312. Thus, the diode D4 prevents current from flowing there through towards the source of the electronic switch 312. In series with the electronic switch 312 between nodes 325 and 327 is another electronic switch 306, with the drains of the electronic switches 312 and 306 being coupled to each other and the virtual ground node 335 or a steady reference potential, without being coupled directly to the negative terminal 122 of the battery 112 (and without being coupled directly to an (external) pin or terminal of the package for electronic fuse 205). A diode D5 is coupled in parallel to a drain and source of the electronic switch 306, an anode of the diode D5 coupled to the source of the electronic switch 306 and a cathode of the diode D5 coupled to the drain of the electronic switch 306. Thus, the diode D5 prevents current from flowing to the load when electronic switch 306 is turned off.

An interconnection controller 337 is coupled to the electronic switch 312, the electronic switch 306, and an energy harvester 320. The interconnection controller 337 includes a plurality of electrical coupling pins S1, G1, G2, S2, K1, Gs, and D. It is noted that for purposes of simplification of explanation, two (2) points of the interconnection controller 337 are labeled as pin D. However, it is to be understood that each point D of the interconnection controller 337 represents a common electrical node (e.g., a pin). The interconnection controller 337 is coupled to the source, drain, and gate of the electronic switch 312 and to the source, drain, and gate of the electronic switch 306. In particular, the pin S1 is coupled to the source of the electronic switch 312, the pin G1 is coupled to the gate of the electronic switch 312, the pin G2 is coupled to the gate of the electronic switch 306, and the pin S2 is coupled to the source of the electronic switch 306. The pin D of the interconnection controller 337 is coupled to the virtual ground node 335 and the drains of the electronic switches 312 and 306.

The interconnection controller 337 is configurable to allow the bi-directional electronic fuse 300 to be used bi-directionally, as discussed above. In a first configuration when a voltage on pin S1 is greater than a voltage on pin S2, the interconnection controller 337 couples pin S1 with pin K1, pin G1 with pin Gs, and pin G2 with pin Sw. In a second configuration when a voltage on pin S1 is less than a voltage on pin S2, the interconnection controller 337 couples pin S2 with pin K1, pin G2 with pin Gs, and pin G1 with pin Sw. Thus, in the first configuration the interconnection controller 337 configures electronic switch 312 to operate in conjunction with the energy harvester 320 to store energy from the battery and configures the electronic switch 306 to selectively couple and decoupled the load 112 from the battery 110. In the second configuration, the interconnection controller 337 configures electronic switch 306 to operate in conjunction with the energy harvester 320 to store energy from the battery and configures the electronic switch 312 to selectively couple and decoupled the load 112 from the battery 110. In both configurations, the virtual ground node becomes the reference point for internal circuit operation.

The bi-directional electronic fuse 300 further includes the energy harvester 320. The energy harvester 320 includes an operational amplifier 322, one input of which is coupled to pin K1 of the interconnection controller 337 and a first input of a charge pump 314. A second input of the operational amplifier 322 is coupled to pin D of the interconnection controller 337 and input of the protection circuit 318. An output of the operation amplifier 322 is coupled to an input of a control circuit 310, an output of the control circuit 310 being coupled to pin Gs of the interconnection controller 337, the control circuit 310 controlling gate voltages of the electronic switches 312 and 306. A second input of the charge pump 314 is coupled to an output of a protection circuit 318, the input of the protection circuit 318 being coupled to pin D of the interconnection controller 337. A diode D11 is coupled between the two inputs of the charge pump 314, an anode of diode D11 coupled to the pin K1 and a cathode of diode D11 is coupled to the pin D of the interconnection controller 337 (e.g., via protection circuit 318). An output of the charge pump 314 is coupled to a voltage control circuit 316, the voltage control circuit 316 supervising operation of the energy harvester 320, supervising a duty cycle of and operation of the charge pump 314, and supervising the output voltage of and operation of the control circuit 310. The charge pump 314 includes an arrangement of diodes D6, D7, etc., and capacitors C4, C5, etc. to store energy from the battery 110 when the energy harvester 320 is switched OFF.

The LDO regulator 224 is coupled to diode D8 and capacitor C7 (e.g., a bypass capacitor), an anode of the diode D8 coupled to an output of the charge pump 314 and a cathode of the diode D8 coupled to the input of the LDO regulator 224. Thus, the diode D8 prevents current from flowing toward the charge pump 314. The LDO regulator 224 outputs a voltage, for example Vcc, which is supplied to the interface circuit 308 and current sensor 302. The output of the LDO regulator 224 is also coupled to a capacitor C8 (e.g., a bypass capacitor) which is coupled to the virtual ground node 335. The LDO regulator 224 controls biasing of the electronic switch 306 or the electronic switch 312 depending on the configuration of the interconnection controller 337.

An input of an interface circuit 308 is coupled to an output of the LDO regulator 224, the input also being coupled to the capacitor C8. A first side of capacitor C8 is coupled to the output of the LDO regulator 224 and a second side of capacitor C8 is coupled to electronic switch 326 of the interface circuit 308. In an example, the electronic switch 326 is a MOSFET. The output of the LDO regulator 224 is further coupled to electronic switch 330 (e.g., a bipolar junction transistor (BJT)) and resistor R5, the resistor R5 also coupled to electronic switch 326. The electronic switch 330 is also coupled to pin SW of the interconnection controller 337 and the electronic switch 326. A gate of the electronic switch 326 is coupled to the alert signal line 332.

The arrangement of components of the interface circuit 308 apply and withhold the voltage generated by the LDO regulator 224 to either the electronic switch 312 or the electronic switch 306, depending on a configuration of the interconnection controller 337, according to the signal on the alert signal line 332 generated by the current sensor 302 on alert signal line 332. The electronic switch 326 receives the alert signal from the alert signal line 332. In response to an absence of the alert signal, the electronic switch 326 activates electronic switch 330 to apply the voltage produced by the LDO regulator 224 to pin Sw. In response to the alert signal on alert signal line 332, the electronic switch 326 deactivates electronic switch 330 to withhold the voltage produced by the LDO regulator 224 from pin Sw. Depending on the configuration of the interconnection controller 337, the voltage from the LDO regulator 224 is either applied or withheld from either electronic switch 312 or electronic switch 306, which either allows a flow of current from the battery 110 to the load 112 or prevents the flow of current from the battery 110 to the load 112.

The electronic fuse 300 does not have direct connection to the negative terminal 122 of the battery 110, that is the electronic fuse 300 is electrically disconnected from the negative terminal 122 of the battery 110. Thus, the current monitor 302, the energy harvester 320, the interface circuit 308, the electronic switches 312 and 306 are electrically disconnected from the negative terminal 122 of the battery 110. For example, the electronic fuse 300 can be an automobile fuse. This configuration of the electronic fuse 300 allows the electronic fuse 300 to work while coupled to only two pins, without a direct connection to the negative terminal 122 of the battery 110, which allows the electronic fuse 300 to replace a conventional fuse in an automotive application without modification to a fuse box that receives the electronic fuse 300. Thus, the electronic fuse 300 can be used in place of a typical single use fuse without requiring any modification to the automotive electrical system in which the electronic fuse 300 is utilized.

Figure 4:
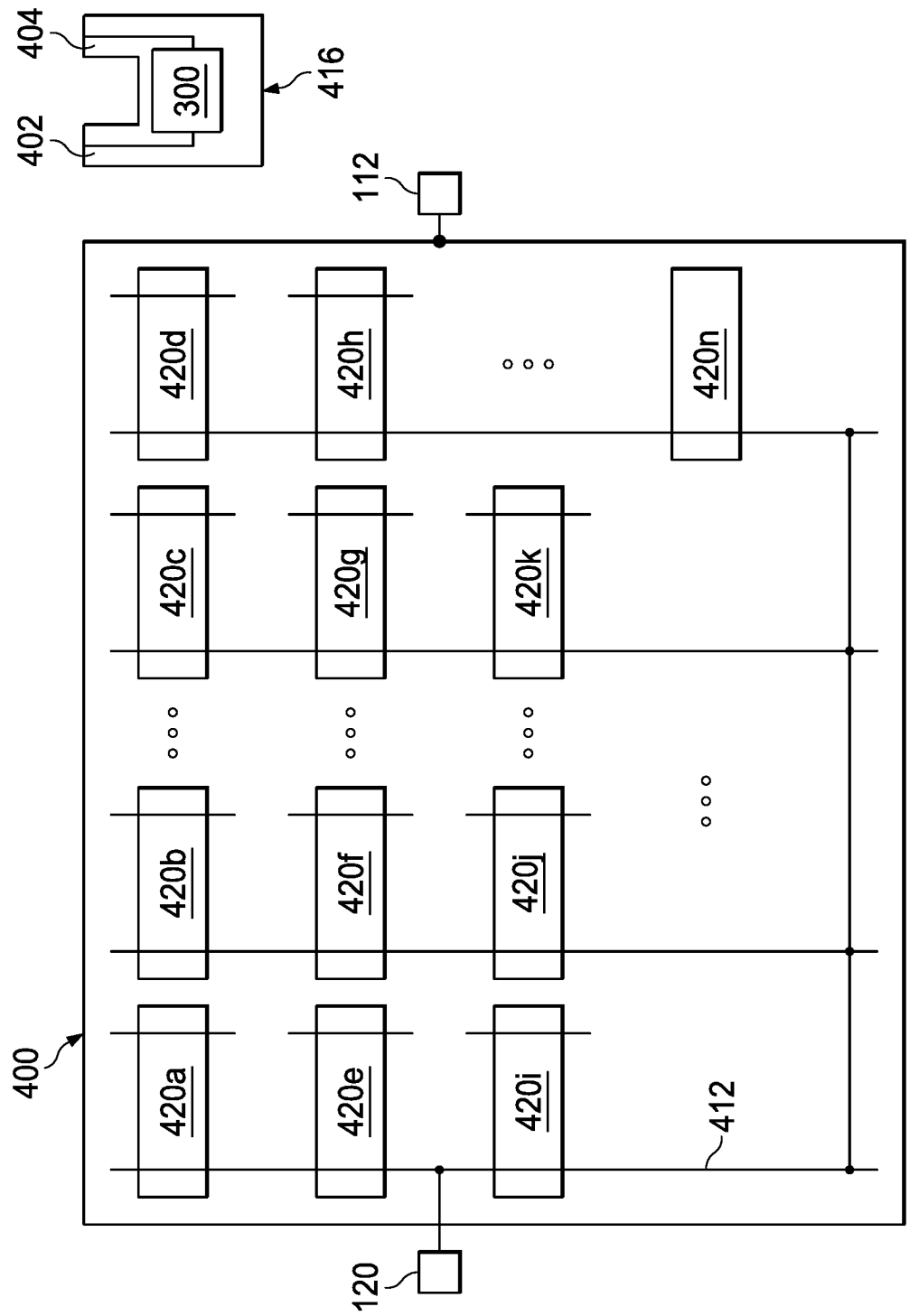
FIG. 4 illustrates a fuse box to which the bi-directional electronic fuse of FIG. 3 is coupled.

FIG. 4 illustrates a fuse box 400 to which the example bi-directional electronic fuse 300 is coupled. The fuse box 400 is coupled to the positive terminal 120. The fuse box 400 includes a bus 412 that couples the positive terminal 120 of the battery 110 to each of a plurality of fuse receptacles 420a-n. Each of the plurality of fuse receptacles 420a-n are coupled to a plurality of loads, a single load 112 is illustrated for simplicity of explanation.

A fuse housing 416 includes the bi-directional electronic fuse 300. The fuse housing 416 includes a fuse terminal 402 and another fuse terminal 404. The fuse housing 416 can be inserted into any of the fuse receptacles 420a-n. The fuse housing 416 is insertable into the fuse receptacles 420a-n to couple the fuse terminal 402 to bus 412 and fuse terminal 404 to load 112. The fuse housing 416 is also insertable into the fuse receptacles 420a-n to couple the fuse terminal 402 to load 112 and fuse terminal 404 to bus 412. Thus, the fuse housing 416 including the bi-directional electronic fuse 300 can be inserted into the fuse receptacles 420a-n irrespective of a direction of insertion, allowing the bi-directional electronic fuse 300 to be electrically coupled to a fuse box 400 without a user having to know which direction the fuse housing 416 is to be inserted into the fuse box 400.

Figure 5:
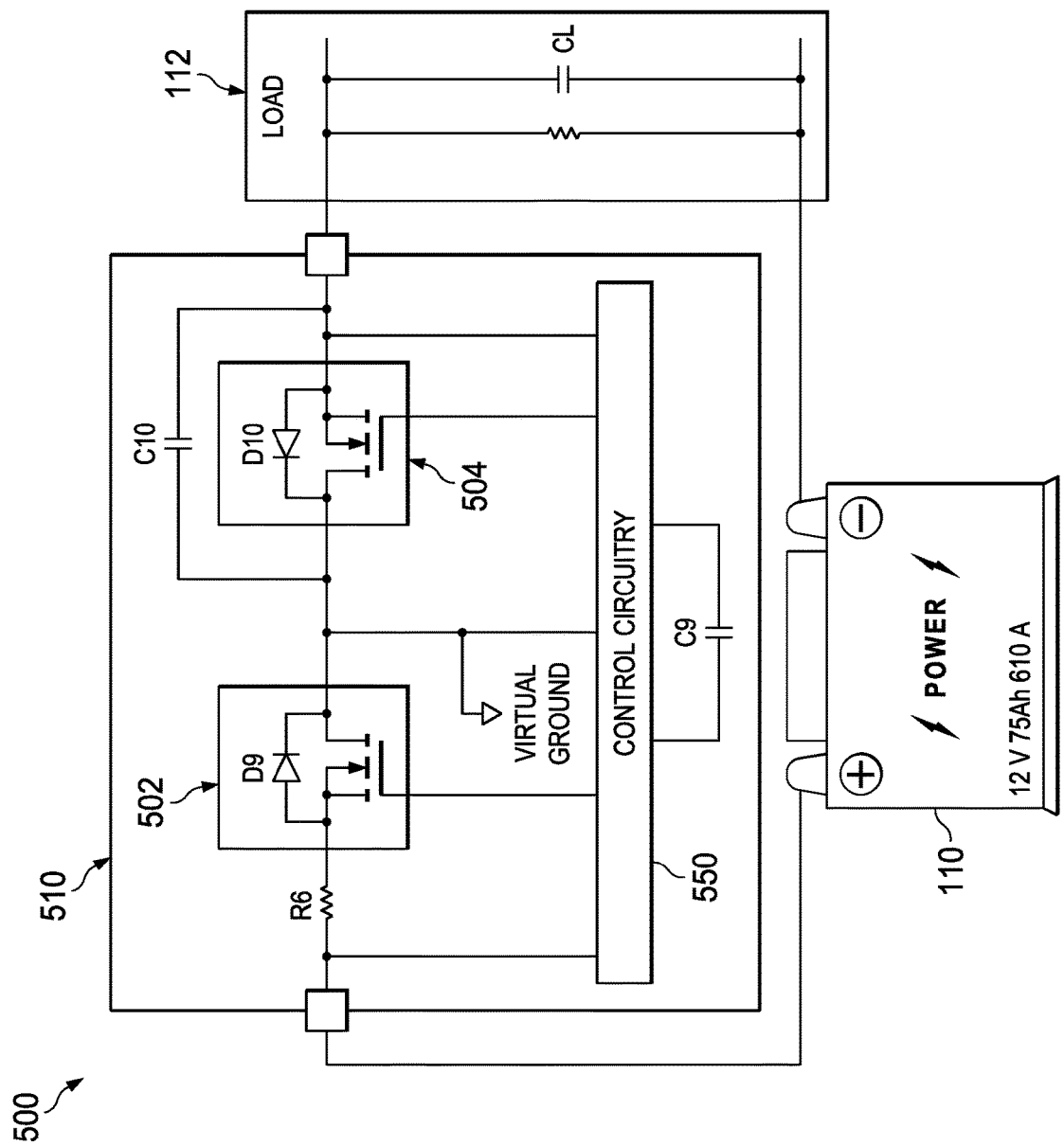
FIG. 5 illustrates another example of another device that includes an electronic switch to selectively couple and decouple the battery and the load.

FIG. 5 illustrates another example of a system 500 including an electronic fuse 510 that includes an electronic switch 504 to selectively couple and decouple the battery 110 and the load 112. The electronic fuse 510 illustrates a solution to start the flow of current between the battery 110 and the load 112 when the load 112 is first coupled to the switch 504 or when the electronic fuse 510 runs out of power. FIGS. 1-3 are illustrated without inclusion of the startup solutions illustrated in FIG. 5 for simplicity of explanation. Typically, back to back MOSFETs in series between the battery 110 and the load 112 do not allow current to flow between the battery 110 and the load 112 when the load 112 is first coupled to a battery 110. The electronic fuse 510 including the capacitor C10 overcomes such a deficiency.

The electronic fuse 510 includes a diode D9 that is coupled to a drain and source of the electronic switch 502, an anode of the diode D9 coupled to the source of the electronic switch 502 and a cathode of the diode D9 coupled to the drain of the electronic switch 502. The diode D9 supports the energy harvester 104/204/320. The electronic fuse 510 further includes a diode D10 that is coupled to a drain and source of the electronic switch 504, an anode of the diode D10 coupled to the source of the electronic switch 502 and a cathode of the diode D10 coupled to the drain of the electronic switch 502. Thus, the diode D10 prevents current from flowing there through towards the source of the electronic switch 504.

The electronic fuse 510 includes a resistor R6 coupled to a positive terminal of the battery 110 and further coupled to both the electronic switch 502 and control circuitry 550. The control circuitry 550 includes a capacitor C9 to store energy from the battery 110. A diode D10 is coupled between the source and drain of the electronic switch 502. The electronic switch 502 is coupled to electronic switch 504, with the drains of the electronic switches 502 and 504 being coupled. The drains of the electronic switches 502 and 504 are also coupled to a virtual ground node 335. A source of the electronic switch 504 is coupled to the load 112. For ease of illustration, electronic circuitry 550 includes the circuitry described above to harvest and store energy from the battery 110, to generate a voltage to power the electronic fuse 510 when the load 112 is selectively disconnected from the battery 110, to selectively reconfigure the electronic switches 502 and 504, and to turn either of switches 502 and 504 ON and OFF in response to an alert signal.

When the electronic switch 504 is initially closed or when the electronic fuse 510 is coupled to the battery 110, inrush current flows across diode D9, capacitor C10, and load 112. An amplitude of the peak inrush current is a function of the capacitor C10 and a load capacitance CL of the load 112. The capacitance of capacitor C10 is selected to control a duration that the inrush current flows, with the duration being configured to turn on electronic switch 504. Peak inrush current is less than a typical fuse since electronic switch 504 is initially OFF.

Also, in an event of a short circuit across the load 112 to a negative terminal 122 of the battery 110 or an overload condition of the electronic fuse 510, the control circuitry 550 will monitor and control an ON/OFF state of the electronic switch 504. In such an event the control circuitry 550 will turn OFF the electronic switch 504 and the electronic fuse 510 will eventually run out of power after a time period. The capacitor C10 allows the electronic switch 504 to toggle frequently to power the control circuitry 550 to allow the control circuitry 550 to check for a fault state of the electronic fuse 510 and to reset the electronic fuse 510 automatically should the fault state cease to exist.

Figure 6:
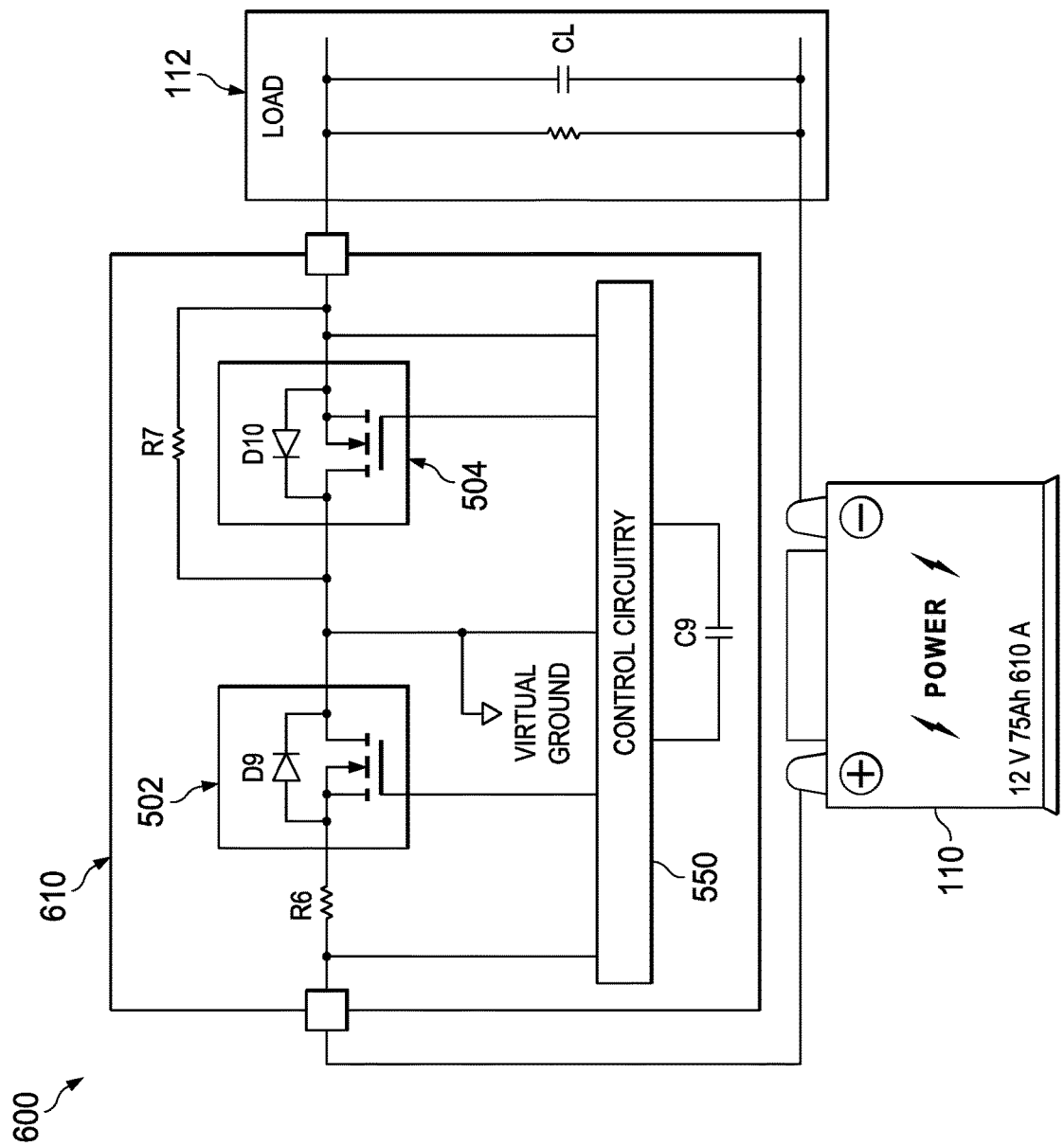
FIG. 6 illustrates another example of another device that includes an electronic switch to selectively couple and decouple the battery and the load.

FIG. 6 illustrates another example of another system 600 including an electronic fuse 610 that includes an electronic switch 504 to selectively couple and decouple the battery 110 and the load 112. The electronic fuse 610 is configured similar to electronic fuse 510, with like components being commonly illustrated. Instead of capacitor C10 in system 500 being coupled to the source and drain of the electronic switch 504, the electronic fuse 610 instead includes a resistor R7 coupled to the source and drain of the electronic switch 504 and in parallel with the diode D10. In an embodiment, electronic switch 504 can include an internal resistance represented by R7. In an alternate embodiment, resistor R7 is a distinct electrical element from electronic switch 504. In an example, the resistor R7 has a resistance greater than 10,000 ohms. FIGS. 1-3 are illustrated without inclusion of the startup solutions illustrated in FIG. 6 for simplicity of explanation. Typically, back to back MOSFETs in series between the battery 110 and the load 112 do not allow current to flow between the battery 110 and the load 112 when the load 112 is first coupled to a battery 110. The electronic fuse 610 including the resistor R7 overcomes such a deficiency.

In this example, when electronic switch 504 is turned OFF in the event of a short circuit across the load 112 or the current drawn by the load 112 exceeding the threshold value, the control circuitry 550 will monitor and control electronic switch 504 when the electronic switch 504 is turned OFF. When the electronic switch 504 is turned OFF, electronic switch 502 will coupled the battery 110 to the load 112, via resistor R7. Thus, a small amount of current will flow across resistor R7 when the electronic switch 504 is turned OFF. This small amount of current allows the control circuitry 550 to continue to operate to toggle the electronic switch 504 ON and OFF at a frequency and to check for the short circuit or the current exceeding the threshold value via shunt resistor R6.

Figure 7:
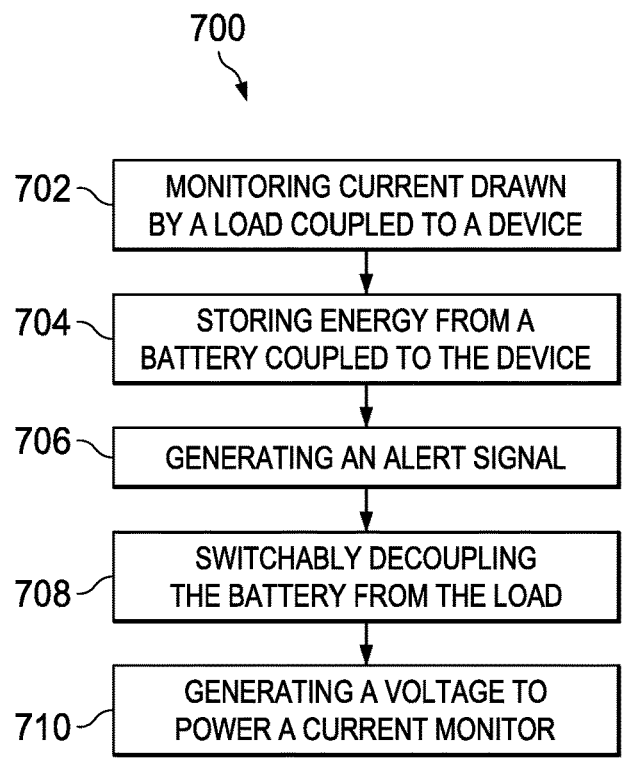
FIG. 7 illustrates an example method of selectively coupling and decoupling the battery and the load.

In view of the foregoing structural and functional features described above, a method in accordance with various aspects of the present disclosure will be better appreciated with reference to FIG. 7. While, for purposes of simplicity of explanation, the method of FIG. 7 is shown and described as executing serially, it is to be understood and appreciated that the present disclosure is not limited by the illustrated order, as some aspects may, in accordance with the present disclosure, occur in different orders and/or concurrently with other aspects from that shown and described herein. Moreover, not all illustrated features may be required to implement a method in accordance with an aspect of the present disclosure.

FIG. 7 illustrates an example method 700 of selectively coupling and decoupling the battery 110 and the load 112. The method can be executed by an electronic fuse, such as the electronic fuse 105/205/300/510/610 illustrated in FIGS. 1-6. At 702, current drawn by the load 112 is monitored. The current monitor 102/202/302 monitors a current across a resistor R2/R4/R6 as a basis to monitor a current drawn by a load 112 coupled to the electronic fuse 105/200/300.

At 704, energy from the battery 110 is stored by an energy harvester 104/204/320 and/or other capacitors in the system. The energy from the battery 110 is being stored while the load 112 is drawing current from the battery 110. The stored energy powers the current monitor 102/202/302.

At 706, an alert signal is generated. The current monitor 102/202/302 generates an alert signal in response to the current monitored by the current monitor 102/202/302 exceeding the predefined threshold value.

At 708, electronic switch 106/212/312/306/502 selectively decouples the battery 110 from the load 112 in response to the alert signal. Such decoupling is performed in response to the alert signal generated in response to the monitored current from 702 drawn by the load 112 exceeding the predefined threshold value. As discussed above, the electronic fuse 105/205/300/510/610 is electrically disconnected from a negative terminal 122 of the battery 110.

At 710, a voltage is generated from the stored energy at 706. The load controller 108 and LDO regulator 224 generate this voltage from the stored energy at 706 to power the current monitor 102/202/302. This powering of the current monitor 102/202/302 allows the alert signal to be reset. The current monitor 102/202/302 thereafter resumes monitoring of the current being drawn by the load 112 from the battery 110.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A system comprising:
a power source;
a load; and
an electronic fuse including:
  a switch to selectively couple and decouple the power source and the load;
  an energy harvester to store energy from the power source while the load is coupled to the power source through the switch and drawing current from the power source;
  a current monitor to generate an alert signal in response to a current drawn by the load exceeding a threshold value, wherein the switch is configured to decouple the power source from the load in response to the alert signal; and
  a controller to generate a voltage using the energy stored by the energy harvester while the power source is decoupled from the load and to apply the voltage to the current monitor to cause the alert signal to be reset.

2. The system of claim 1, wherein the power source includes a battery.

3. The system of claim 2, wherein:
the battery includes a first terminal and a second terminal;
the switch is configured to selectively couple and decouple the load to the first terminal of the battery; and
the load is also coupled to the second terminal.

4. The system of claim 1, wherein the electronic fuse includes a shunt resistor arranged between the power source and the load, and wherein the alert signal generated by the current monitor is based on monitoring a current across the shunt resistor.

5. The system of claim 1, wherein the controller includes a low dropout (LDO) regulator to generate the voltage that is applied to the current monitor.

6. The system of claim 1, wherein the system is an automobile electrical system and the electronic fuse is an automobile fuse.

7. The system of claim 1, wherein the energy harvester includes one or more capacitors to store the energy from the power source while the load is drawing current from the power source.

8. A system comprising:
a power source;
a load; and
an electronic fuse including:
  an energy harvester including:
    an input to receive energy supplied by the power source while the load coupled to the power source through the electronic fuse and drawing a current from the power source through the electronic fuse;
    an energy storage device to store the energy received at the input;
    an output to provide the energy stored by the energy storage device when the power source and the load are decoupled; and
    a virtual ground connection configured to serve as a ground terminal of the power source for the energy harvester.

9. The system of claim 8, wherein the energy storage device includes a charge pump to store the energy received at the input of the energy harvester.

10. The system of claim 8, comprising a load controller having an input coupled to the output of the energy harvester, wherein the load controller is configured to output a common current voltage in response to the energy stored by the energy storage device being supplied to the input of the load controller.

11. The system of claim 10, wherein the load controller includes a low dropout regulator.

12. The system of claim 8, comprising:
a first switch;
a second switch; and
an interconnection controller;
wherein the input of the energy harvester is coupled to an interconnection controller and the interconnection controller is configured to couple the first switch to the energy harvester in a first configuration and the second switch to the energy harvester in a second configuration.

13. The system of claim 8, wherein the system is an automobile electrical system and the electronic fuse is an automobile fuse.

14. The system of claim 13, wherein the power source includes a car battery.

15. The system of claim 8, wherein the system is a residential electrical system.

16. A method comprising:
storing energy supplied by a power source to a load while the load is coupled to the power source through an electronic fuse;
monitoring a current drawn by the load while coupled to the power source through the electronic fuse;
controlling the electronic fuse to decouple the load from the power source in response to detecting an alert condition in which the current drawn by the load exceeds a threshold; and
while the load is decoupled from the power source, using the stored energy to generate a voltage used to reset the alert condition.

17. The method of claim 16, comprising using a low dropout regulator to generate the voltage used to reset the alert condition.

18. The method of claim 16, comprising generating an alert signal in response to detecting the alert condition.

19. The method of claim 16, wherein the electronic fuse is an automobile fuse.

\* \* \* \* \*